(12) United States Patent
Vänska et al.

(10) Patent No.: US 9,823,696 B2
(45) Date of Patent: Nov. 21, 2017

(54) LIMITING MOVEMENT

(75) Inventors: Anssi Ilmari Vänska, Helsinki (FI); Matti Kosonen, Jarvenpaa (FI); Antti Oskari Salo, Lohja (FI)

(73) Assignee: Nokia Technologies Oy, Espoo (FI)

( * ) Notice: Subject to any disclaimer, the term of this patent is extended or adjusted under 35 U.S.C. 154(b) by 1197 days.

(21) Appl. No.: 13/458,025

(22) Filed: Apr. 27, 2012

(65) Prior Publication Data

US 2013/0286553 A1    Oct. 31, 2013

(51) Int. Cl.
     *F16C 11/04*    (2006.01)
     *G06F 1/16*    (2006.01)
     *H04M 1/02*    (2006.01)

(52) U.S. Cl.
     CPC .......... *G06F 1/1615* (2013.01); *G06F 1/1652* (2013.01); *H04M 1/0202* (2013.01); *H04M 1/0206* (2013.01); *H04M 1/0208* (2013.01); *H04M 1/0268* (2013.01); *Y10T 29/4984* (2015.01); *Y10T 403/32549* (2015.01)

(58) Field of Classification Search
     CPC .......... Y10T 403/32549; Y10T 403/45; Y10T 16/525; Y10T 16/5257; H04M 1/0268; H04M 1/0206; H04M 1/0208; G06F 1/1615; G06F 1/1652
See application file for complete search history.

(56) References Cited

U.S. PATENT DOCUMENTS 1,410,366 A    3/1922    Buchman
1,619,502 A *   3/1927    Fox .......................... E05D 3/186
                                                               16/358
(Continued)

FOREIGN PATENT DOCUMENTS

CN      1598870 A    3/2005
CN      1617614 A    5/2005
(Continued)

OTHER PUBLICATIONS

"How Users Manipulate Deformable Displays as Input Devices", Sang-Su Lee et al Apr. 10-15, 2010, (pp. 1647-1656).
(Continued)

*Primary Examiner* — Matthieu F Setliff
*Assistant Examiner* — Matthew R McMahon
(74) *Attorney, Agent, or Firm* — Harrington & Smith (57) ABSTRACT

An apparatus includes first and second portions configured for relative movement; and a compression transmission arrangement extending between them and configured to enable movement of the first portion and the second portion towards each other and further configured to transmit compression forces between the first portion and the second portion to limit movement of the first portion and the second portion towards each other. The apparatus further includes a tension transmission arrangement extending between those portions which is configured to enable movement of the first portion and the second portion away from each other and further configured to transmit tension forces between the first portion and the second portion to limit movement of the first portion and the second portion away from each other. Both transmission arrangements may be on the same side of an equilibrium plane of the apparatus.

7 Claims, 6 Drawing Sheets (56) References Cited

U.S. PATENT DOCUMENTS

| | | | | |
|---|---|---|---|---|
| 2,311,470 A * | 2/1943 | Ritter | E06B 9/08 | |
| | | | 160/201 | |
| 3,148,724 A * | 9/1964 | Chieger | B60J 5/14 | |
| | | | 160/201 | |
| 3,297,077 A * | 1/1967 | Garbus | E06B 3/481 | |
| | | | 160/118 | |
| 3,324,930 A * | 6/1967 | Colombo | E05D 3/12 | |
| | | | 16/224 | |
| 3,363,383 A * | 1/1968 | La Barge | E04B 1/6175 | |
| | | | 404/65 | |
| 3,570,579 A * | 3/1971 | Matsushima | A47B 17/04 | |
| | | | 16/366 | |
| 3,880,500 A | 4/1975 | Kojabashian | 359/847 | |
| 4,344,475 A * | 8/1982 | Frey | A47G 5/00 | |
| | | | 16/225 | |
| 4,438,605 A * | 3/1984 | DeLucia | E04B 1/76 | |
| | | | 16/225 | |
| 4,483,020 A | 11/1984 | Dunn | 2/2.5 | |
| 4,716,698 A * | 1/1988 | Wilson | H02G 3/288 | |
| | | | 174/505 | |
| 4,762,020 A * | 8/1988 | Schmidberger | B23Q 11/085 | |
| | | | 160/231.2 | |
| 4,785,565 A * | 11/1988 | Kuffner | A47F 5/105 | |
| | | | 160/135 | |
| 5,007,108 A | 4/1991 | Laberge et al. | 2/2 | |
| 5,133,108 A * | 7/1992 | Esnault | E05D 15/242 | |
| | | | 16/225 | |
| 5,148,850 A * | 9/1992 | Urbanick | E05D 15/242 | |
| | | | 16/225 | |
| 5,176,463 A * | 1/1993 | Kraus | B29C 45/0017 | |
| | | | 16/227 | |
| 5,214,623 A | 5/1993 | Seager | 368/10 | |
| 5,488,982 A * | 2/1996 | Rejc | E06B 3/485 | |
| | | | 160/133 | |
| 5,588,167 A | 12/1996 | Pahno et al. | 5/606 | |
| 5,613,541 A * | 3/1997 | Bradbury | B60J 5/14 | |
| | | | 160/231.2 | |
| 5,706,026 A | 1/1998 | Kent et al. | 345/156 | |
| 5,771,489 A | 6/1998 | Snedeker | 2/12.5 | |
| 5,795,430 A | 8/1998 | Beeteson et al. | 156/350 | |
| 5,923,318 A | 7/1999 | Zhai et al. | 345/157 | |
| 6,016,176 A | 1/2000 | Kim et al. | | |
| 6,160,540 A | 12/2000 | Fishkin et al. | 345/184 | |
| 6,378,172 B1 * | 4/2002 | Schrage | E05D 3/12 | |
| | | | 16/225 | |
| 6,441,809 B2 | 8/2002 | Kent et al. | 345/177 | |
| 6,556,189 B1 | 4/2003 | Takahata et al. | 345/173 | |
| 6,557,177 B2 | 5/2003 | Hochmuth | 2/159 | |
| 7,075,527 B2 | 7/2006 | Takagi et al. | 345/184 | |
| 7,443,380 B2 | 10/2008 | Nozawa | 345/156 | |
| 7,446,757 B2 * | 11/2008 | Mochizuki | G06F 1/1616 | |
| | | | 345/168 | |
| 7,456,823 B2 | 11/2008 | Poupyrev et al. | 345/173 | |
| 8,194,399 B2 | 6/2012 | Ashcraft et al. | 361/679.05 | |
| 8,380,327 B2 | 2/2013 | Park | 700/1 | |
| 8,581,859 B2 | 11/2013 | Okumura et al. | | |
| 8,619,021 B2 | 12/2013 | Hayton | 345/107 | |
| 8,780,540 B2 | 7/2014 | Whit et al. | 361/679.09 | |
| 8,780,541 B2 | 7/2014 | Whit et al. | 361/679.09 | |
| 8,804,324 B2 * | 8/2014 | Bohn | G06F 1/1616 | |
| | | | 345/1.1 | |
| 8,929,085 B2 * | 1/2015 | Franklin | G06F 1/1626 | |
| | | | 361/749 | |
| 8,999,474 B2 * | 4/2015 | Casteras | B64G 1/222 | |
| | | | 16/221 | |
| 2001/0033275 A1 | 10/2001 | Kent et al. | 345/173 | |
| 2002/0033798 A1 | 3/2002 | Nakamura et al. | 345/156 | |
| 2002/0167495 A1 | 11/2002 | Quinn et al. | 345/173 | |
| 2003/0043087 A1 * | 3/2003 | Kim | G06F 1/1601 | |
| | | | 345/1.1 | |
| 2003/0060269 A1 | 3/2003 | Paulsen et al. | | |
| 2003/0144034 A1 | 7/2003 | Hack et al. | 455/566 | |
| 2003/0147205 A1 | 8/2003 | Murphy et al. | 361/680 | |
| 2003/0210801 A1 | 11/2003 | Naksen et al. | | |
| 2003/0214485 A1 | 11/2003 | Roberts | 345/173 | |
| 2003/0227441 A1 | 12/2003 | Hioki et al. | 345/156 | |
| 2004/0008191 A1 | 1/2004 | Poupyrev et al. | 345/184 | |
| 2004/0017355 A1 | 1/2004 | Shim | 345/157 | |
| 2004/0035994 A1 | 2/2004 | Cho et al. | 248/276.1 | |
| 2004/0046739 A1 | 3/2004 | Gettemy | 345/158 | |
| 2004/0212588 A1 | 10/2004 | Moriyama | | |
| 2004/0239631 A1 | 12/2004 | Gresham | | |
| 2005/0051693 A1 | 3/2005 | Chu | 248/371 | |
| 2005/0057527 A1 | 3/2005 | Takenaka et al. | 345/173 | |
| 2005/0140646 A1 | 6/2005 | Nozawa | 345/156 | |
| 2005/0162389 A1 | 7/2005 | Obermeyer et al. | 345/161 | |
| 2005/0237308 A1 | 10/2005 | Autio et al. | 345/173 | |
| 2006/0007151 A1 | 1/2006 | Ram | 345/163 | |
| 2006/0077672 A1 | 4/2006 | Schaak | | |
| 2006/0199999 A1 | 9/2006 | Ikeda et al. | | |
| 2006/0238494 A1 | 10/2006 | Narayanaswami et al. | 345/156 | |
| 2007/0040810 A1 | 2/2007 | Dowe et al. | 345/173 | |
| 2007/0097014 A1 * | 5/2007 | Solomon | G06F 1/1616 | |
| | | | 345/1.1 | |
| 2007/0154254 A1 | 7/2007 | Bevirt | 403/56 | |
| 2007/0205997 A1 | 9/2007 | Lieshout et al. | 345/204 | |
| 2007/0242033 A1 | 10/2007 | Cradick et al. | | |
| 2007/0247422 A1 | 10/2007 | Vertegaal et al. | 345/156 | |
| 2008/0018631 A1 | 1/2008 | Hioki et al. | 345/206 | |
| 2008/0042940 A1 | 2/2008 | Hasegawa | 345/76 | |
| 2008/0251662 A1 | 10/2008 | Desorbo et al. | | |
| 2009/0058828 A1 | 3/2009 | Jiang et al. | 345/173 | |
| 2009/0085866 A1 | 4/2009 | Sugahara | 345/156 | |
| 2009/0088204 A1 | 4/2009 | Culbert et al. | 455/556.1 | |
| 2009/0115734 A1 | 5/2009 | Fredriksson et al. | 345/173 | |
| 2009/0184921 A1 | 7/2009 | Scott et al. | 345/156 | |
| 2009/0219247 A1 | 9/2009 | Watanabe et al. | 345/157 | |
| 2009/0237872 A1 | 9/2009 | Bemelmans et al. | 361/679.01 | |
| 2009/0244013 A1 | 10/2009 | Eldershaw | 345/173 | |
| 2009/0326833 A1 | 12/2009 | Ryhanen et al. | 702/33 | |
| 2010/0011291 A1 | 1/2010 | Nurmi | 715/702 | |
| 2010/0013939 A1 | 1/2010 | Ohno et al. | 348/208.5 | |
| 2010/0056223 A1 | 3/2010 | Choi et al. | | |
| 2010/0060548 A1 | 3/2010 | Choi et al. | 345/1.3 | |
| 2010/0108828 A1 | 5/2010 | Yu et al. | | |
| 2010/0120470 A1 | 5/2010 | Kim et al. | 455/566 | |
| 2010/0134428 A1 | 6/2010 | Oh | | |
| 2010/0141605 A1 | 6/2010 | Kang et al. | | |
| 2010/0164888 A1 | 7/2010 | Okumura et al. | 345/173 | |
| 2010/0228295 A1 | 9/2010 | Whitefield | | |
| 2010/0238612 A1 | 9/2010 | Hsiao et al. | 361/679.01 | |
| 2010/0263245 A1 | 10/2010 | Bowser | 40/517 | |
| 2011/0007000 A1 | 1/2011 | Lim | | |
| 2011/0057873 A1 | 3/2011 | Geissler et al. | 345/156 | |
| 2011/0062703 A1 | 3/2011 | Lopez et al. | 285/129.1 | |
| 2011/0080155 A1 | 4/2011 | Aldridge | 323/318 | |
| 2011/0095999 A1 | 4/2011 | Hayton | 345/173 | |
| 2011/0141053 A1 | 6/2011 | Bulea et al. | | |
| 2011/0141069 A1 | 6/2011 | Hirakata et al. | | |
| 2011/0167391 A1 | 7/2011 | Momeyer et al. | 715/863 | |
| 2011/0181494 A1 | 7/2011 | Wong et al. | 345/1.3 | |
| 2011/0193771 A1 | 8/2011 | Chronqvist | 345/156 | |
| 2011/0227822 A1 | 9/2011 | Shai | 345/156 | |
| 2011/0241822 A1 | 10/2011 | Opran et al. | 340/4.31 | |
| 2011/0298786 A1 | 12/2011 | Cho et al. | | |
| 2011/0298789 A1 | 12/2011 | Cho et al. | | |
| 2012/0044620 A1 * | 2/2012 | Song | G06F 1/1616 | |
| | | | 361/679.01 | |
| 2012/0110784 A1 * | 5/2012 | Hsu | G06F 1/1681 | |
| | | | 16/226 | |
| 2012/0162876 A1 * | 6/2012 | Kim | H04M 1/0237 | |
| | | | 361/679.01 | |
| 2012/0206375 A1 | 8/2012 | Fyke et al. | 345/173 | |
| 2013/0083496 A1 | 4/2013 | Franklin | | |
| 2013/0120912 A1 * | 5/2013 | Ladouceur | H04M 1/0268 | |
| | | | 361/679.01 | |
| 2013/0178344 A1 | 7/2013 | Walsh et al. | | |
| 2013/0187864 A1 | 7/2013 | Paasovaara et al. | | |
| 2013/0194207 A1 | 8/2013 | Andrew et al. | | |
| 2013/0197819 A1 | 8/2013 | Vanska et al. | | |

(56) References Cited

U.S. PATENT DOCUMENTS

| | | | |
|---|---|---|---|
| 2013/0286553 A1 | 10/2013 | Vanska et al. | 361/679.01 |
| 2013/0335929 A1 | 12/2013 | Cavallaro | 361/749 |
| 2014/0003006 A1 | 1/2014 | Ahn | 361/749 |

FOREIGN PATENT DOCUMENTS

| | | |
|---|---|---|
| CN | 101430601 A | 5/2009 |
| CN | 201758267 U | 3/2011 |
| EP | 1657965 A2 | 5/2006 |
| EP | 1770965 A1 | 4/2007 |
| EP | 1830436 A1 | 9/2007 |
| EP | 1970886 A1 | 9/2008 |
| EP | 2166443 A2 | 3/2010 |
| EP | 2202624 A2 | 6/2010 |
| EP | 2315186 A2 | 4/2011 |
| EP | 2508960 A2 | 10/2012 |
| GB | 2456512 A | 7/2009 |
| JP | 2002278515 A | 9/2002 |
| JP | 2003015795 A | 1/2003 |
| JP | 2004046792 A | 2/2004 |
| JP | 2004192241 A | 7/2004 |
| JP | 2008152426 A | 7/2008 |
| KR | 2006-0134130 A | 12/2006 |
| KR | 20090006718 A | 1/2009 |
| KR | 20090006718 A | 1/2009 |
| KR | 20090006807 A | 1/2009 |
| KR | 2009-001161 A | 2/2009 |
| TW | 200404248 A | 3/2004 |
| WO | WO 00/60438 A | 10/2000 |
| WO | WO 2005/093548 A1 | 10/2005 |
| WO | 2006014230 A2 | 2/2006 |
| WO | 2008150600 A1 | 12/2008 |
| WO | WO 2009/050107 A2 | 4/2009 |
| WO | WO-2010/041227 A1 | 4/2010 |
| WO | WO 2011/117681 A1 | 9/2011 |
| WO | WO 2011117681 A1 | 9/2011 |
| WO | WO 2011/144972 A1 | 11/2011 |
| WO | WO-2013/160737 A1 | 10/2013 |

OTHER PUBLICATIONS

"Gummi: A bendable computer", Dr Ivan Poupyrev—http://ivanpoupyrev.com/proiects/gummi.php, (1994-2012), (7 pages).

"Murata Tactile controller TV remote hands-on (video)", Zach Honig—http://www.engadget.com2011/10/05/murata-tactile-controller-tv-remote-ands-on-vi . . . , (2012), (8 pages).

"Press release: revolutionary new paper computer shows flexible future for smartphones and tablets", http://www.hml.queensu.ca/paperphone, (2012), (2 pages).

Smith, Matt; *Nokia's kinetic future: flexible screens and a twisted interface*; Oct. 26, 2012; http://www.engadget.com/2011/10/26/nokias-kinetic-future-flexible-screens-and-a-twisted-interface/ (4 pages).

Mina; *Samsung Unveils Flexible Android Smartphone*; http://www.androidauthority.com/samsung-unveils-flexible-android-smartphone-24933/, (Sep. 21, 2011), (8 pages).

Lahey, Byron et al.; "PaperPhone: Understanding the Use of Bend Gestures in Mobile Devices with Flexible Electronic Paper Displays"; CHI 2011—Session: Flexible Grips & Gestures; May 7-12, 2011; pp. 1303-1312.

Tajika, Taichi et al.; "Intuitive Page-Turning Interface of E-Books on Flexible E-Paper Based on User Studies"; 2008; Proceedings of the 16th ACM International Conference on Multimedia MM '08; pp. 793-796.

Melanson, Donald; "Nokia patent application points to flexible phone displays"; Jan. 19, 2010; http://www.engadget.com/2010/01/19/nokia-patent-application-points-to-flexible-phone-displays/.

Watanabe, Jun-ichiro, et al., "Booksheet: Bendable Device for Browsing Content Using the Metaphor of Leafing Through the Pages", Sep. 21-24, 2008, pp. 360-369.

\* cited by examiner

LIMITING MOVEMENT

TECHNOLOGICAL FIELD

Embodiments of the present invention relate to limiting movement, for example bending and/or twisting, of an apparatus.

BACKGROUND

It would be desirable to provide an apparatus that may be bent and/or twisted without being bent and/or twisted too much.

BRIEF SUMMARY

According to some but not necessarily all embodiments of the invention there is provided an apparatus comprising: a first portion; a second portion, where the first portion and the second portion are configured for relative movement; a compression transmission arrangement extending between the first portion and the second portion configured to enable movement of the first portion and the second portion towards each other and configured to transmit compression forces between the first portion and the second portion to limit movement of the first portion and the second portion towards each other; and a tension transmission arrangement extending between the first portion and the second portion configured to enable movement of the first portion and the second portion away from each other and configured to transmit tension forces between the first portion and the second portion to limit movement of the first portion and the second portion away from each other.

According to some but not necessarily all embodiments of the invention there is provided an apparatus comprising: a first portion; a second portion, where the first portion and the second portion are configured to move relative to one another; a first compression resisting surface; a first tension resisting surface displaced from the first compression resisting surface in first direction; a link structure configured to transmit compression forces and tension forces to the second portion and comprising a first compression abutment surface and a first tension abutment surface; wherein the first compression resisting surface, the first compression abutment surface, the first tension abutment surface and the first tension resisting surface are configured such that relative spacing between the first compression resisting surface and the first tension resisting surface and between the first compression abutment surface and the first tension abutment surface enables movement of the first portion and the second portion towards each other in the first direction to a minimum separation distance determined by abutment of the first compression resisting surface and the first compression abutment surface and enables movement of the first portion and the second portion away from each other in the first direction to a maximum separation distance determined by abutment of the first tension resisting surface and the first tension abutment surface.

According to some but not necessarily all embodiments of the invention there is provided a method comprising: constraining flexibility of an apparatus by providing a compression transmission arrangement extending between a first portion and a second portion of the apparatus, wherein the compression transmission arrangement is configured to enable movement of the first portion and the second portion towards each other and is configured to transmit compression forces between the first portion and the second portion to limit movement of the first portion and the second portion towards each other; and constraining flexibility of an apparatus by providing a tension transmission arrangement extending between the first portion and the second portion, wherein the tension transmission arrangement is configured to enable movement of the first portion and the second portion away from each other and is configured to transmit tension forces between the first portion and the second portion to limit movement of the first portion and the second portion away from each other.

BRIEF DESCRIPTION

For a better understanding of various examples of embodiments of the present invention reference will now be made by way of example only to the accompanying drawings in which.

DETAILED DESCRIPTION

The description describes a number of examples of an apparatus 2. It should be understood that other examples of the apparatus 2 are possible while still falling within the scope of the claims.

The description describes a number of features or parts of an apparatus 2. It should be understood that other examples of the features and parts are possible while still falling within the scope of the claims. The description of a part or feature in relation to one example does not necessarily imply that that feature or part is essential to either that example or all examples. The description of a part or feature in relation to one example but not another example does not necessarily imply that that feature or part is unsuitable for use in that other example.

Figure 1A:
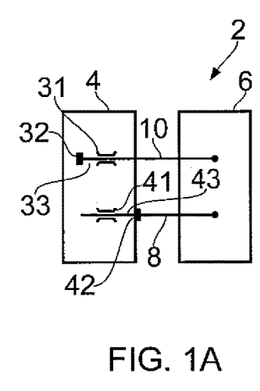
FIGS. 1A, 1B and 1C illustrate one example of an apparatus that limits movement.
Figure 1B:
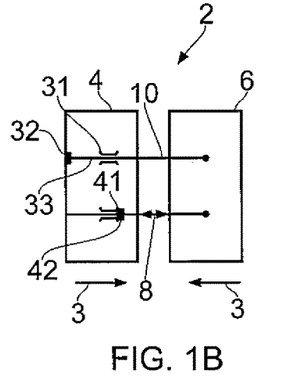
Figure 1C:
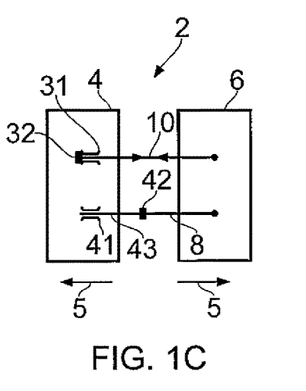

FIGS. 1A, 1B and 1C illustrate one example of an apparatus 2 that comprises a first portion 4 and a second portion 6. The first portion 4 and the second portion 6 are configured for relative movement. The movement may be movement 3 towards each other as illustrated in FIG. 1B or movement 5 away from each other as illustrated in FIG. 1C.

A compression transmission arrangement 8 extends between the first portion 4 and the second portion 6. It is, in this example, configured both to enable movement of the first portion 4 and the second portion 6 towards each other and also to limit movement of the first portion 4 and the second portion 6 towards each other. The compression transmission arrangement 8 is configured to transmit compression forces between the first portion 4 and the second portion 6 to limit movement of the first portion 4 and the second portion 6 towards each other, such that they do not approach within a minimum value for a separation distance between the first portion 4 and the second portion 6.

A tension transmission arrangement 10 extends between the first portion 4 and the second portion 6. It is, in this example, configured both to enable movement of the first portion 4 and the second portion 6 away from each other and also to limit movement of the first portion 4 and the second portion 6 away from each other. The compression transmission arrangement 8 is configured to transmit tension forces between the first portion 4 and the second portion 8 to limit movement of the first portion 4 and the second portion 6 away from each other, such that they do not separate by more than a maximum value for a separation distance between the first portion 4 and the second portion 8.

The compression transmission arrangement 8, in this example, is configured to transmit compression forces between the first portion 4 and the second portion 6 and, in this example, comprises a first compression abutment surface 42.

A first compression resisting surface 41 is, in this example, configured to transmit a force to the first portion 4. It may, for example be connected or coupled to the first portion 4. It may, for example, be fixed to the first portion 4 or an integral part of the first portion 4.

Relative spacing between the first compression resisting surface 41 and the first compression abutment surface 42, in this example, enables movement of the first portion 4 and the second portion 6 towards each other as is illustrated by the sequence of FIG. 1C, FIG. 1A, and FIG. 1B.

When the first portion 4 and the second portion 6 move towards each other in this example, a first gap 43 between the compression resisting surface 41 and the compression abutment surface 42 decreases in size and a second gap 33 between the tension resisting surface 31 and the tension abutment surface 32 increases is size.

The first portion 4 and the second portion 6 move towards each other in this example until abutment of the first compression resisting surface 41 and the first compression abutment surface 42 as illustrated in FIG. 1B. Abutment of the first compression resisting surface 41 and the first compression abutment surface 42 creates a compression force. The compression force transmitted through the compression transmission arrangement 8 resists further movement of the first portion 4 and the second portion 6 towards each other beyond a minimum separation distance. The compression transmission arrangement 8 therefore should be capable of transmitting a compressive force. It may therefore comprise a structure that is stiff and strong.

The tension transmission arrangement 10, in this example, is configured to transmit tension forces between the first portion 4 and the second portion 6 and comprises, in this example, a first tension abutment surface 32.

A first tension resisting surface 31 is configured, in this example, to transmit a force to the first portion 4. It may, for example be connected or coupled to first portion 4. It may, for example, be fixed to the first portion 4 or an integral part of the first portion 4.

Relative spacing between the first tension resisting surface 31 and the first tension abutment surface 32 in this example, enables movement of the first portion 4 and the second portion 6 away from each other as is illustrated by the sequence of FIG. 1B, FIG. 1A, and FIG. 1C.

When the first portion 4 and the second portion 6 move away from each other in this example the first gap 43 between the compression resisting surface 41 and the compression abutment surface 42 increases in size and the second gap 33 between the tension resisting surface 31 and the tension abutment surface 32 decreases in size.

The first portion 4 and the second portion 6 move away from each other in this example until abutment of the first tension resisting surface 31 and the first tension abutment surface 32 as illustrated in FIG. 1C. Abutment of the first tension resisting surface 31 and the first tension abutment surface 32 creates a tension force. The tension force transmitted through the tension transmission arrangement 10 resists further movement of the first portion 4 and the second portion 6 away from each other beyond a maximum separation distance. The tension transmission arrangement 10 therefore needs to be capable of transmitting a tension force. It may therefore comprise a structure that has good tensile strength.

Figure 4A:
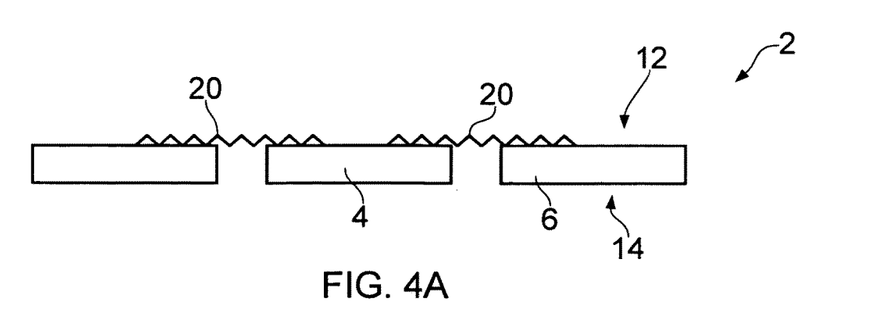
FIGS. 4A, 4B and 4C illustrate straining of an apparatus that limits movement.
Figure 4B:
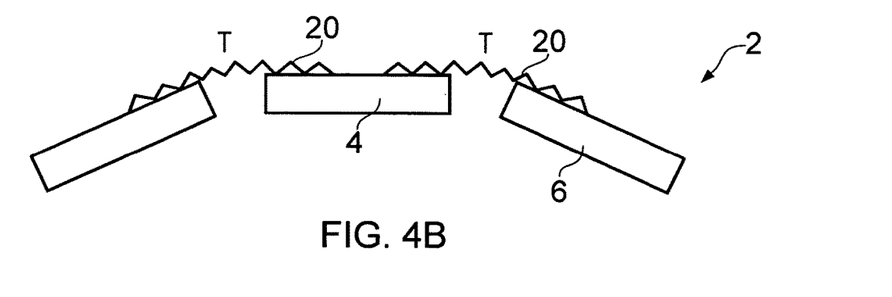
Figure 4C:
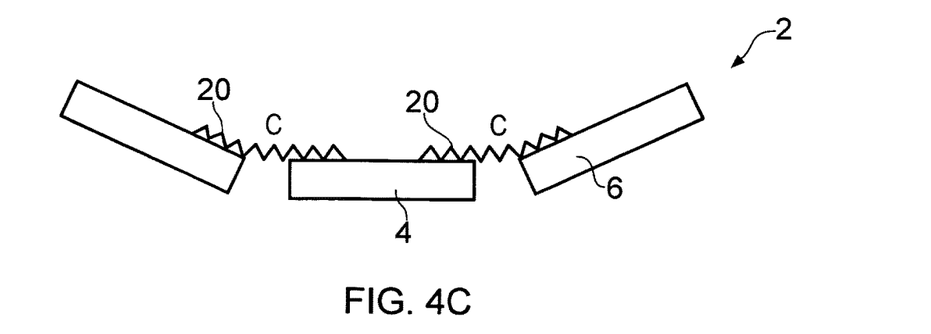

As illustrated in FIGS. 4A, 4B and 4C the compression transmission arrangement 8 and the tension transmission arrangement 10 may, in some examples, be located on the same side 12 of an equilibrium plane of the apparatus 2.

Straining of the apparatus 2 so that the side 12 is lengthened, as illustrated in the example of FIG. 4B, generates tension on the side 12 of the equilibrium plane. The straining may arise from bending and/or twisting the apparatus 2. The length is measured over the surface of the side 12. This surface is flat in FIG. 4A and arcuate in FIG. 4B.

Straining of the apparatus 2 so that first side 12 is shortened, as illustrated in the example of FIG. 4C, generates compression on the first side of the equilibrium plane. The straining may arise from bending and/or twisting the apparatus 2. The length is measured over the surface of the side 12. This surface is flat in FIG. 4A and arcuate in FIG. 4C.

FIGS. 2A, 2B, 3A and 3C illustrate another example of the apparatus 2. The description of the apparatus 2 presented above in relation to FIGS. 1A, 1B and 1C is also applicable to FIGS. 2A, 2B, 3A and 3B.

In the examples of FIGS. 2A, 2B, 3A and 3C a link structure 20 is configured to provide simultaneously the compression transmission arrangement 8 and the tension transmission arrangement 10.

The link structure 20 is configured, in these examples, to transmit both compression forces and tension forces (at different times) between the first portion 4 and the second portion 6.

The link structure 20, in these examples, provides the first compression abutment surface 42 and the first tension abutment surface 32. The link structure 20 and these surfaces move relative to the first compression resisting surface 41 and the first tension resisting surface 31 as the first portion 4 and the second portion move towards and away from each other. The link structure 20 is configured to reciprocate relative to the first compression resisting surface 41 and the first tension resisting surface 31 when there is reciprocating movement of the second portion 6 relative to the first portion 4.

In this example, the relative spacing between the first compression resisting surface 41 and the first tension resisting surface 31 is fixed and the relative spacing between the first compression abutment surface 42 and the first tension abutment surface 32 is fixed.

Figure 2A:
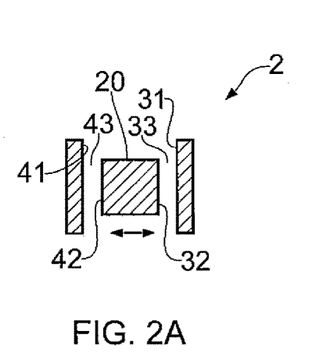
FIGS. 2A and 2B illustrate examples of an apparatus that limits movement using an interior situated link structure.
Figure 2B:
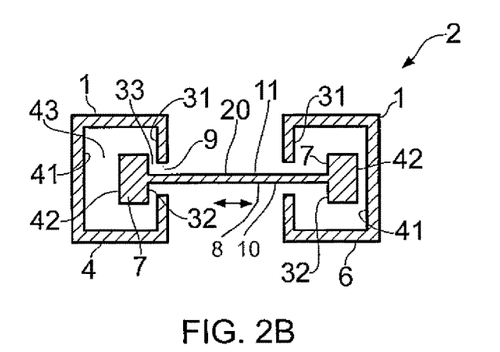

In the examples illustrated in FIGS. 2A and 2B, the first compression resisting surface 41 and the first tension resisting surface 31 oppose one another and a head 7 of the link structure 20 is positioned between them in an interior situation. The head 7 provides the first compression abutment surface 42 and the first tension abutment surface 32.

A fixed relative spacing between the first compression resisting surface 41 and the first tension resisting surface 31 is, in this example, greater than a fixed relative spacing between the first compression abutment surface 42 and the first tension abutment surface 32.

In the example of FIG. 2A, the link structure 20 may be connected or coupled to the second portion 6. The first compression resisting surface 41 and the first tension resisting surface 31 may be connected to the first portion 4.

FIG. 2B illustrates an example where the link structure 20 is coupled to both the first portion 4 and the second portion 6 by respective the first compression resisting surfaces 41 and the first tension resisting surfaces 31 in the manner illustrated in FIG. 2A.

An enclosure 1 provides a continuous structure that, in this example, defines and interconnects the first compression resisting surface 41 and the first tension resisting surface 31. In this example the enclosure has a C-like shape. The link structure 20 comprises a head 7 that is positioned within the enclosure 1 and connected to a connector 11 of fixed length that passes through a gap 9 in the enclosure 1. The head 7 has a greater width than the gap 9. Movement of the connector 11 of the link structure moves the head 7 of the link structure 20.

In this example, the link structure comprises a first head 7 that is surrounded by enclosure 1 of the first portion 4 and a second head 7 that is surrounded by an enclosure 1 of the second portion 4 where the first and second heads 7 are interconnected by a rigid connector 11.

However, in other examples, the link structure may comprise a single head 7 that is surrounded by the enclosure 1 of, for example, the first portion 4 where the head 7 is fixedly connected to the second portion 6 via a rigid connector 11.

Figure 3A:
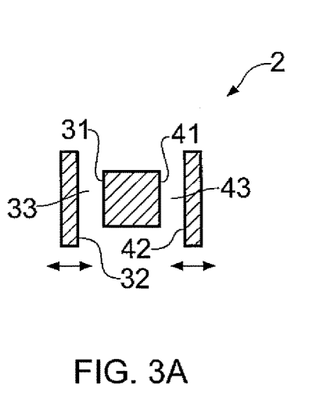
FIGS. 3A and 3B illustrate examples of an apparatus that limits movement using an exterior situated link structure.
Figure 3B:
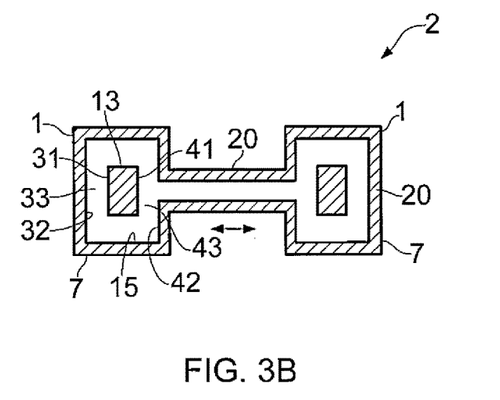

In the examples illustrated in FIGS. 3A and 3B, the first compression abutment surface 42 and the first tension abutment surface 32 oppose one another and a head 7 of the link structure 20 is positioned around them in an exterior situation. The head 7 provides the first compression abutment surface 42 and the first tension abutment surface 32.

A fixed relative spacing between the first compression resisting surface 41 and the first tension resisting surface 31 is, in this example, less than a fixed relative spacing between the first compression abutment surface 42 and the first tension abutment surface 32.

In the example of FIG. 2A, the link structure 20 may be connected or coupled to the second portion 4. The first compression resisting surface 41 and the first tension resisting surface 31 may be connected to the first portion 4.

FIG. 3B illustrates an example where the link structure 20 is coupled to both the first portion 4 and the second portion 6 by respective first compression resisting surfaces 41 and the first tension resisting surfaces 31 in the manner illustrated in FIG. 3A.

The link structure 20 comprises, in this example, a looped head 7 that encloses a projection 13 of the first portion 4 defining the first compression resisting surface 41 and the first tension resisting surface 31.

The head 7 of the link structure 20 provides, in this example, an enclosure 1 which provides a continuous structure that defines and interconnects the first compression abutment surface 42 and the first tension abutment surface 32. In this example the enclosure has a O-like shape. An interior surface 15 of the looped head 7 defines the first compression abutment surface 42 and the first tension abutment surface 32.

In this example, the link structure comprises a first looped head 7 that encloses a projection 13 of the first portion 4 and a second looped head 7 that encloses a projection 13 of the second portion 4 where the first and second looped heads 7 are interconnected by a rigid connector 11.

However, in other examples, the link structure may comprise a single looped head 7 that encloses a projection 13 of, for example, the first portion 4 where the looped head 7 is fixedly connected to the second portion 6 via a rigid connector 11.

Figure 5A:
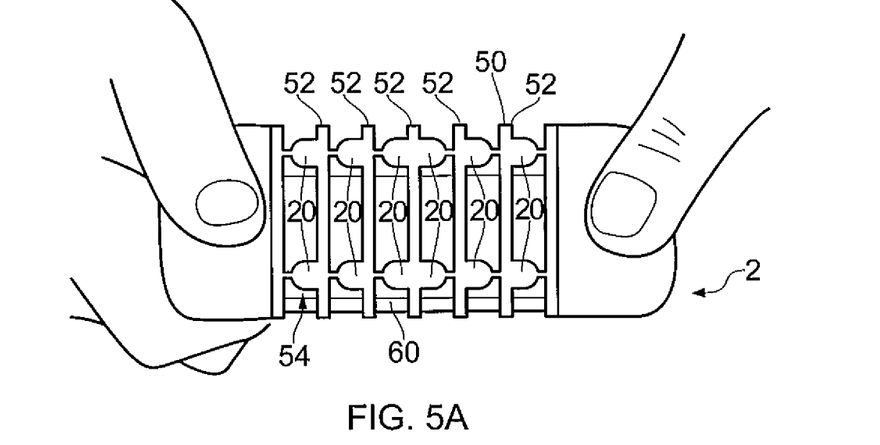
FIGS. 5A, 5B and 5C illustrate an example of an apparatus that uses a ribbed structure to limit movement.
Figure 5B:
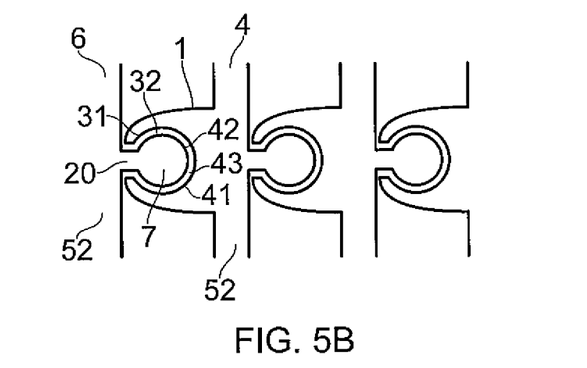
Figure 5C:
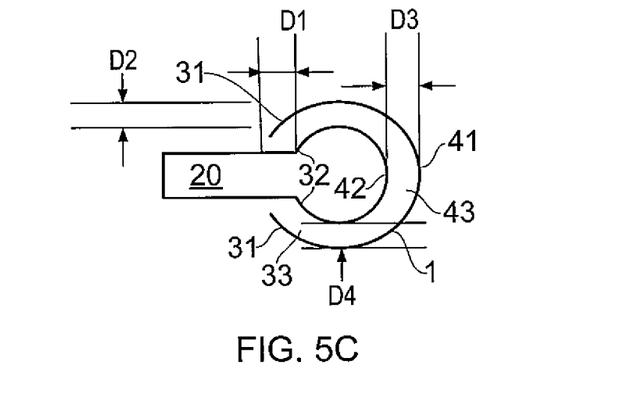

FIGS. 5A, 5B and 5C illustrate an example of an apparatus 2.

In this example, the apparatus 2 forms a ribbed structure 50 defining a cavity 54 using ribs 52.

The ribs 52 extend laterally in parallel. In this example the ribs also curve at their lateral extremities forming the cavity 54 within a cage. Gaps between the ribs 52 enable relative movement of the ribs 52. In this example the spacing between adjacent ribs is greater than a width of a rib 52.

Each pair of ribs 52 are interconnected longitudinally using a link structure 20 and enclosure 1.

Thus a compression transmission arrangement 8 interconnects a pair of adjacent ribs 52 longitudinally and a tension transmission arrangement 10 interconnects the same pair of ribs 52, where the compression transmission arrangement 8 and the tension transmission arrangement 10 are provided by a link structure 20.

In this illustrated example, each rib 52 is associated with a pair of spaced parallel link structures 20. A series of parallel ribs 52 are serially interconnected by serial pairs of link structures 20.

As illustrated in FIG. 5B, the first portion 4 of the apparatus 2 is provided by a rib 52 and the second portion 6 of the apparatus 2 is provided by an adjacent rib 52.

In this example, the link structure 20 is an integral part of the second portion 6 of the apparatus 2. It has a short connector and a curved circular head 7. The circular head 7 is received by a correspondingly circular enclosure 1 which is integrated with the first portion 4 of the apparatus 2.

In a manner similar to FIGS. 2A and 2B, the head 7 provides the first compression abutment surface 42 and the first tension abutment surface 32 and the enclosure 1 provides the first compression resisting surface 41 and the first tension resisting surface 31.

The extent of relative movement between the first portion 4 and the second portion 6 is determined by, for example, dimensions D1, D2, D3 and D4 as illustrated in FIG. 5C.

The dimension D1 defines a size of the gap 33 between the first tension abutment surface 32 and the first tension resisting surface 31. The dimensions D3 define a size of the gap 43 between the first compression abutment surface 42 and the first compression resisting surface 41. These dimensions determine relative movement in the longitudinal direction and control the extent to which the longitudinal plane of the apparatus 2 may be bent up or down manually by a user.

The dimensions D2 and D4 define the sizes of lateral gaps between the head 7 and enclosure 1. These dimensions determine relative movement in the lateral direction and control the extent to which the longitudinal plane of the apparatus 2 may be twisted manually by a user.

One or more of the dimensions D1 to D4 may be varied to obtain desired bending and/or twisting characteristics for the apparatus 2.

Referring back to FIG. 5A, electronic components 60 may be housed within the cavity 54.

Figure 6:
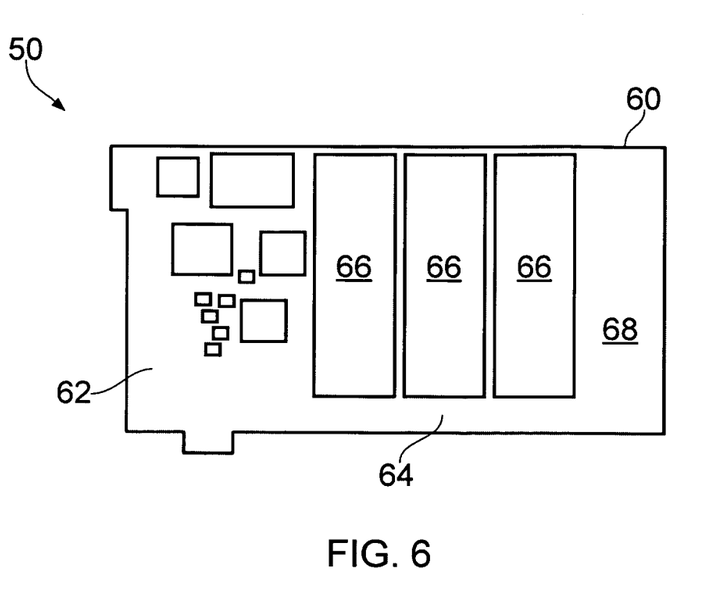
FIG. 6 illustrates an example of electronic components that may be housed within the ribbed structure.

FIG. 6 illustrates an example of electronic components 50.

In this example a flexible substrate 60 has three distinct areas illustrated using 62, 64, 68. The longitudinal extremities 62 and 68 may be rigid. The middle area 64 may be flexible.

A circuit board 62 is housed at one extremity. This circuit board may, for example, house one or more antennas, radio frequency circuitry, a camera, interface circuitry etc A circuit board 68 is housed at the other extremity. This circuit board may, for example, house one or more processors, one or more antennas, radio frequency circuitry, etc.

A modular battery 64 occupies a central position (longitudinally). In this example it is divided into three modules 66. Each module is inflexible, however, the modules may move relative to each other by hinging about laterally extending interfaces between the modules 66. The modules 66 extend in parallel laterally. When the flexible substrate 60 is bent along its longitudinal axis the modules 66 move relative to one another.

Referring back to FIG. 5A, ribs 52 of the apparatus 2 may be aligned with the laterally extending interfaces between the modules 66 of the battery 64.

Figure 7A:
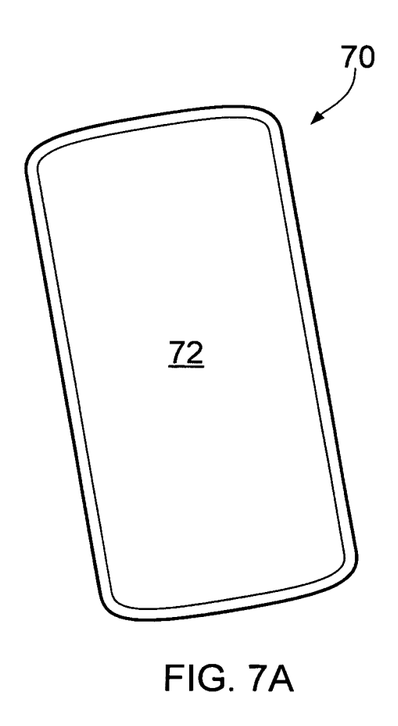
FIGS. 7A and 7B illustrate a device that comprises an exterior housing for the ribbed structure.
Figure 7B:
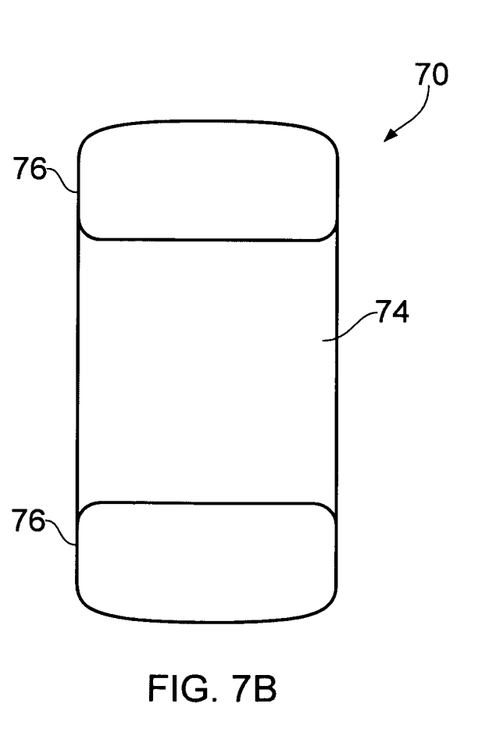

FIGS. 7A and 7B illustrate a device 70 that comprises the apparatus 2. The apparatus may, for example, be the ribbed structure 50 which may comprise electronic components 50.

This device comprises a flexible display 72 that is presented on a font face of the device 70 as illustrated in FIG. 7A.

FIG. 7B illustrates a rear face of the device 70. The rear of the device comprises an exterior housing that has rigid portions 76 at its longitudinal extremities that correspond with the inflexible extremities of the substrate 60 and a flexible middle cover portion 74 that corresponds with the flexible middle portion (e.g. battery 64) of the substrate 60.

The whole device 70 may be bendable and/or twistable.

FIGS. 8, 9, 10 and 11 illustrate alternative examples to the apparatus 2 illustrated in FIG. 5A. In these examples, as in the example of FIG. 5A, the apparatus 2 forms a ribbed structure 50 defining a cavity 54 using ribs 52. These examples differ from the example of FIG. 5A and from each other in that they may use different compression transmission arrangements 8 and tension transmission arrangements 10.

Figure 8:
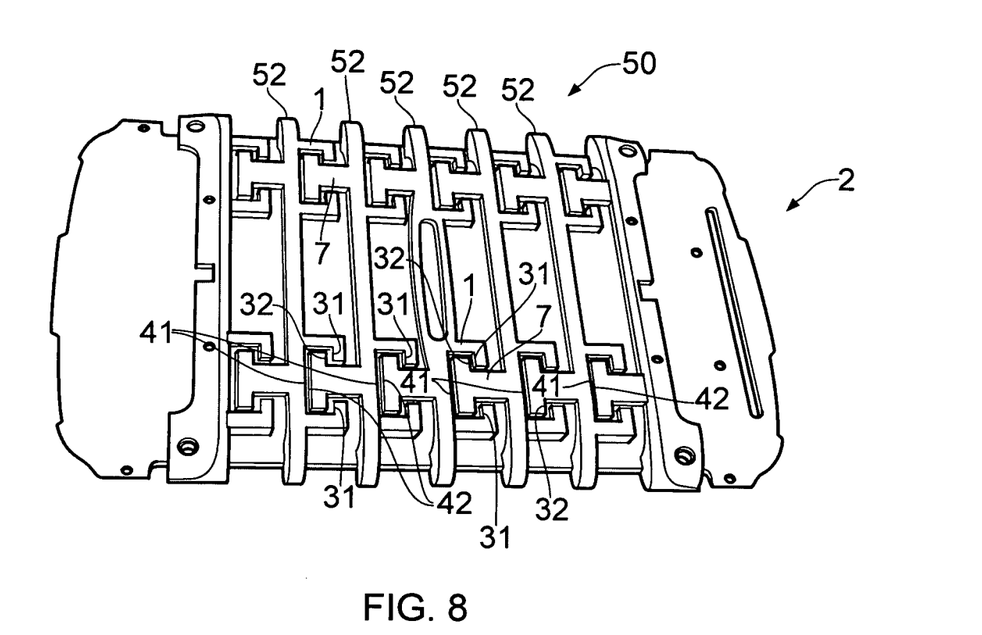
FIGS. 8, 9, 10 and 11 illustrate alternative examples of an apparatus that uses a ribbed structure and different compression and tension arrangements to limit movement.

In FIG. 8, a link structure 20 is used to provide both the compression transmission arrangements 8 and compression transmission arrangements 10. This example is similar to the example illustrated in FIG. 5A except that the head 7 of the link structure 20 has a different shape. In this example, the head 7 is not curved but is rectangular. The enclosure 1 has a corresponding rectangular inner surface.

Also in FIG. 5A, the ordering of head 7 and enclosure 1 switched at a longitudinal midpoint of the ribbed structure 50, so that the link structures 20 of the ribbed structure 50 are arranged with reflection symmetry about a lateral axis extending through the longitudinal midpoint of the ribbed structure 50. Whereas, in FIG. 8, the ordering of head 7 and enclosure 1 does not change, so that the link structures 20 of the ribbed structure 50 are arranged without reflection symmetry about a lateral axis extending through the longitudinal midpoint of the ribbed structure 50.

Figure 9:
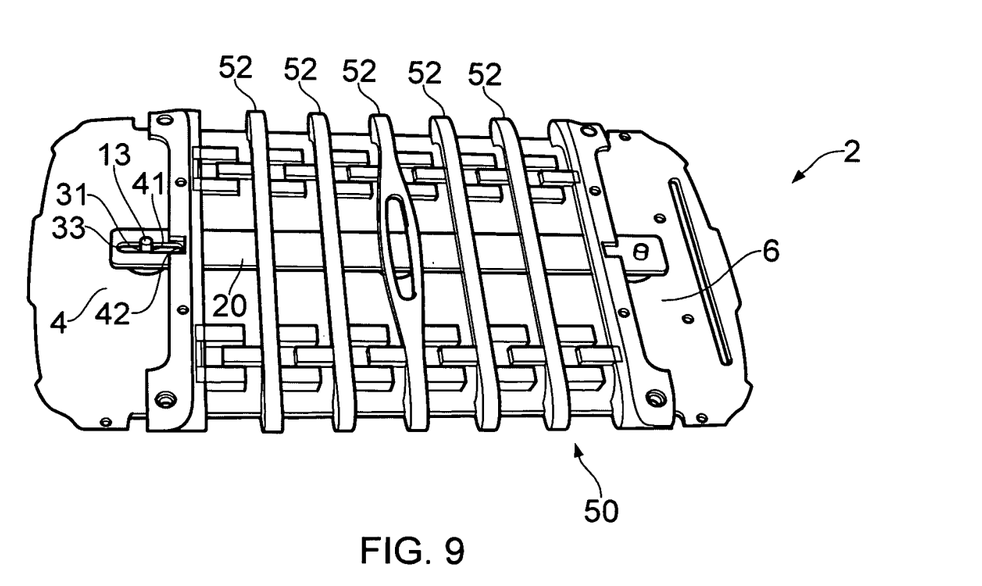

In FIG. 9, a link structure 20 is used to provide both the compression transmission arrangements 8 and compression transmission arrangements 10. This example is different to the example illustrated in FIG. 5A in that a single link structure 20 is provided which spans all of the ribs instead of providing individual link structures 20 between ribs 52.

In this example, the first portion 4 and the second portion 6 are at the extremities of the ribbed structure 50. There are multiple intervening ribs 52 between first and second portions.

The operation of the link structure is similar to that illustrated in FIGS. 3A and 3B (where one end of the link structure is connected to the first portion 4 rather than coupled to it).

Figure 10:
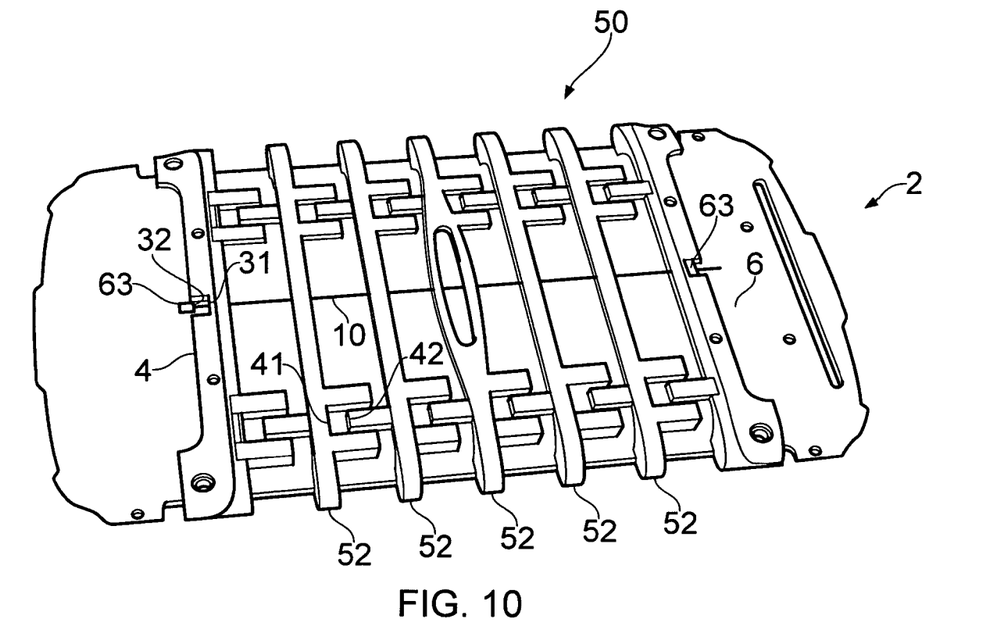

In FIG. 10, a link structure 20 is used to provide the compression transmission arrangements 8 but not the tension transmission arrangements 10. As only compression transmission is required, the link structure does not require a head 7 that is wider than the connector.

In FIG. 10, the tension transmission arrangement 10 is provided by a wire that has two stops 63 that are positioned a distance X apart. The wire runs through the first part 4 and through the second part where they have a separation Y. The difference X-Y determines the extent to which the apparatus 2 may be bent.

Figure 11:
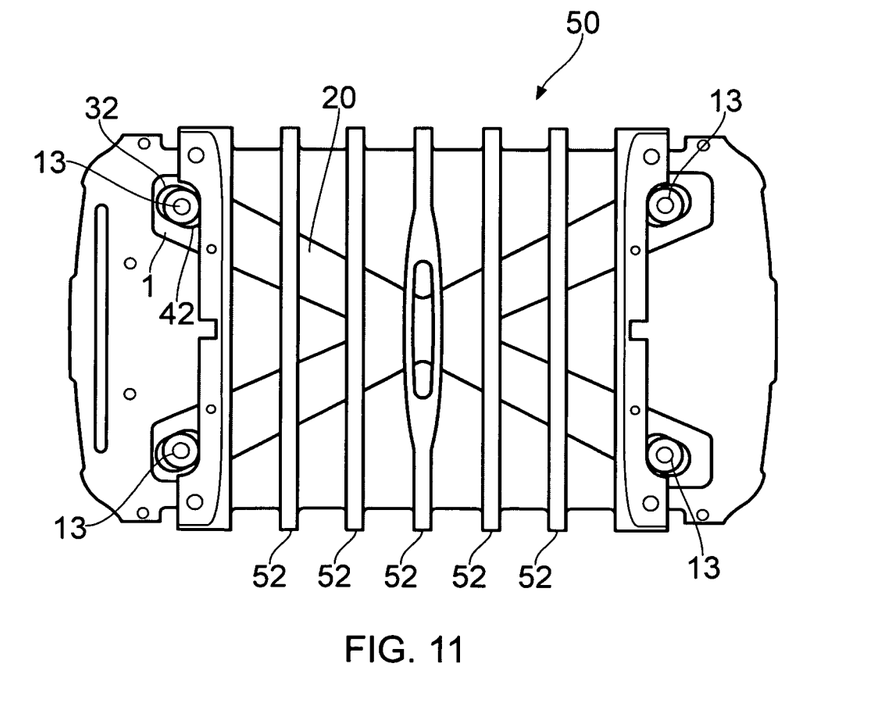

In FIG. 11, a link structure 20 is used to provide both the compression transmission arrangement 8 and compression transmission arrangement 10. This example is different to the example illustrated in FIG. 5A in that a single link structure 20 is provided which spans all of the ribs instead of providing individual link structures 20 between ribs 52.

In this example, the first portion 4 and the second portion 6 are at the extremities of the ribbed structure 50. There are multiple intervening ribs 52 between first and second portions.

In this example, the link structure has a X shape (a cross bar) rather than a rectilinear shape as in FIG. 9.

The X shape constrains not only longitudinal movement but also lateral movement.

The operation of the link structure is similar to that illustrated in FIGS. 3A and 3B (where one end of the link structure is coupled to the first portion rather than connected to it).

Referring back to FIGS. 1A, 1B and 1C, it will from the foregoing be appreciated that these figures disclose a method comprising:

i) constraining flexibility of an apparatus by providing a compression transmission arrangement extending between a first portion and a second portion of the apparatus, wherein the compression transmission arrangement is configured to enable movement of the first portion and the second portion towards each other and is configured to transmit compression forces between the first portion and the second portion to limit movement of the first portion and the second portion towards each other;

and ii) constraining flexibility of an apparatus by providing a tension transmission arrangement extending between the first portion and the second portion, wherein the tension transmission arrangement is configured to enable movement of the first portion and the second portion away from each other and is configured to transmit tension forces between the first portion and the second portion to limit movement of the first portion and the second portion away from each other.

This method may be used to protect electronic components 50 housed within the apparatus.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A flexible electronic device comprising electronic components and an apparatus configured to constrain flexibility of the flexible electronic device, the apparatus comprising:
    a first portion;
    a second portion, where the first portion and the second portion are configured for relative movement;
    a compression transmission arrangement extending between the first portion and the second portion configured in a first non-abutting configuration of the compression transmission arrangement to enable movement of the first portion and the second portion towards each other and configured in a second abutting configuration of the compression transmission arrangement to transmit compression forces between the first portion and the second portion to limit movement of the first portion and the second portion towards each other;
    a tension transmission arrangement extending between the first portion and the second portion configured in a first non-abutting configuration of the tension transmission arrangement to enable movement of the first portion and the second portion away from each other and configured in a second abutting configuration of the tension transmission arrangement to transmit tension forces between the first portion and the second portion to limit movement of the first portion and the second portion away from each other;
    a ribbed structure comprising a plurality of ribs that are interconnected in series in a first direction by first link structures providing, in part, the compression transmission arrangement, and that are interconnected in series in the first direction by second link structures, separated from the first link structures by a gap extending in a second orthogonal direction, providing, in part, the compression transmission arrangement, wherein the plurality of ribs extend in the second direction with gaps therebetween;
    wherein each link structure is configured to provide simultaneously the compression transmission arrangement and the tension transmission arrangement;
    a first compression resisting surface; and
    a first tension resisting surface displaced from the first compression resisting surface, wherein each link structure is configured to transmit compression forces and tension forces to the second portion and comprises a first compression abutment surface and a first tension abutment surface, and
        wherein the first compression resisting surface, the first compression abutment surface, the first tension abutment surface and the first tension resisting surface are configured such that relative spacing between the first compression resisting surface and the first tension resisting surface and between the first compression abutment surface and the first tension abutment surface enables movement of the first portion and the second portion towards each other until abutment of the first compression resisting surface and the first compression abutment surface and enables movement of the first portion and the second portion away from each other until abutment of the first tension resisting surface and the first tension abutment surface; and
    wherein an enclosure defines the first compression resisting surface and the first tension resisting surface, each link structure comprises a head that is positioned within the enclosure and a gap in the enclosure receives the head of the link structure and enables reciprocation of the link structure.

2. The flexible electronic device as claimed in claim 1 wherein the first compression resisting surface is configured to transmit a compression force to the first portion and the first tension resisting surface is configured to transmit a tension force to the first portion.

3. The flexible electronic device as claimed in claim 1 wherein the first compression resisting surface, the first compression abutment surface, the first tension abutment surface and the first tension resisting surface are configured such that the relative spacing between the first compression resisting surface and the first tension resisting surface is fixed and the relative spacing between the first compression abutment surface and the first tension abutment surface is fixed.

4. The flexible electronic device as claimed in claim 1 wherein the first compression resisting surface, the first compression abutment surface, the first tension abutment surface and the first tension resisting surface are configured such that a fixed relative spacing between the first compression resisting surface and the first tension resisting surface is greater than a fixed relative spacing between the first compression abutment surface and the first tension abutment surface and wherein the first compression resisting surface, the first compression abutment surface, the first tension abutment surface and the first tension resisting surface are configured such that the first compression resisting surface and the first tension resisting surface oppose one another.

5. The flexible electronic device as claimed in claim 1, wherein at least some of the plurality of ribs are centrally positioned ribs of the ribbed structure and are aligned with interfaces between components housed within the ribbed structure.

6. The flexible electronic device as claimed in claim 5, comprising a flexible exterior cover aligned with the centrally positioned ribs of the ribbed structure that are aligned with interfaces between components housed within the ribbed structure.

7. A flexible electronic device comprising electronic components and an apparatus configured to constrain flexibility of the flexible electronic device, the apparatus comprising:
    a first portion;
    a second portion, where the first portion and the second portion are configured to move relative to one another;
    a first compression resisting surface;
    a first tension resisting surface displaced from the first compression resisting surface in a first direction;
    a first link structure and a second link structure, each configured to transmit compression forces and tension forces to the second portion and comprising a first compression abutment surface and a first tension abutment surface;

wherein the first compression resisting surface, the first compression abutment surface, the first tension abutment surface and the first tension resisting surface are configured such that relative spacing between the first compression resisting surface and the first tension resisting surface and between the first compression abutment surface and the first tension abutment surface enables movement of the first portion and the second portion towards each other in the first direction determined by non-abutment of the first compression resisting surface and the first compression abutment surface to a minimum separation distance between the first portion and the second portion determined by abutment of the first compression resisting surface and the first compression abutment surface and enables movement of the first portion and the second portion away from each other in the first direction determined by non-abutment of the first tension resisting surface and the first tension abutment surface to a maximum separation distance between the first portion and the second portion determined by abutment of the first tension resisting surface and the first tension abutment surface; and a ribbed structure comprising a plurality of ribs that extend in a second orthogonal direction with gaps therebetween that are interconnected in series in the first direction by a first plurality of link structures including the first link structure, and that are interconnected in series in the first direction by a second plurality of link structures including the second link structure, separated from the first link structure by a gap extending in the second direction;

wherein an enclosure defines the first compression resisting surface and the first tension resisting surface, each link structure comprises a head that is positioned within the enclosure and a gap in the enclosure receives the head of the link structure and enables reciprocation of the link structure.

\* \* \* \* \*